(12) United States Patent
Luo et al.

(10) Patent No.: US 7,085,769 B1
(45) Date of Patent: *Aug. 1, 2006

(54) METHOD AND APPARATUS FOR PERFORMING HASH JOIN

(75) Inventors: Gang Luo, Madison, WI (US); Curt J. Ellmann, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 734 days.

This patent is subject to a terminal disclaimer.

(21) Appl. No.: 09/842,991

(22) Filed: Apr. 26, 2001

(51) Int. Cl.
*G06F 17/30* (2006.01)
(52) U.S. Cl. ......................... 707/102; 707/10
(58) Field of Classification Search ............ 707/1, 707/4, 5, 2, 104, 3, 100, 10, 102
See application file for complete search history.

(56) References Cited

U.S. PATENT DOCUMENTS

| | | | | |
|---|---|---|---|---|
| 4,930,072 A * | 5/1990 | Agrawal et al. | ............ | 707/101 |
| 5,551,031 A * | 8/1996 | M. Cheng et al. | ............ | 707/2 |
| 5,557,791 A * | 9/1996 | Cheng et al. | ............ | 707/2 |
| 5,613,142 A * | 3/1997 | Matsumoto | ............ | 707/2 |
| 5,745,896 A * | 4/1998 | Vijaykumar | ............ | 707/100 |
| 5,802,357 A * | 9/1998 | Li et al. | ............ | 707/2 |
| 5,832,475 A * | 11/1998 | Agrawal et al. | ............ | 707/2 |
| 5,854,938 A * | 12/1998 | Ogi | ............ | 707/7 |
| 5,873,074 A * | 2/1999 | Kashyap et al. | ............ | 707/2 |
| 5,884,320 A * | 3/1999 | Agrawal et al. | ............ | 707/104.1 |
| 5,901,324 A * | 5/1999 | Ogi | ............ | 712/28 |
| 5,983,215 A * | 11/1999 | Ross et al. | ............ | 707/2 |
| 6,032,144 A * | 2/2000 | Srivastava et al. | ............ | 707/3 |
| 6,061,676 A * | 5/2000 | Srivastava et al. | ............ | 707/3 |
| 6,081,801 A * | 6/2000 | Cochrane et al. | ............ | 707/3 |
| 6,112,198 A * | 8/2000 | Lohman et al. | ............ | 707/3 |
| 6,205,441 B1 * | 3/2001 | Al-omari et al. | ............ | 707/2 |
| 6,226,639 B1 * | 5/2001 | Lindsay et al. | ............ | 707/5 |
| 6,263,331 B1 * | 7/2001 | Liu et al. | ............ | 707/4 |
| 6,415,297 B1 * | 7/2002 | Leymann et al. | ............ | 707/201 |
| 6,484,159 B1 * | 11/2002 | Mumick et al. | ............ | 707/2 |
| 6,493,701 B1 * | 12/2002 | Ponnekanti | ............ | 707/2 |
| 6,542,886 B1 * | 4/2003 | Chaudhuri et al. | ............ | 707/2 |
| 6,618,719 B1 * | 9/2003 | Andrei | ............ | 707/2 |
| 6,625,593 B1 * | 9/2003 | Leung et al. | ............ | 707/2 |
| 6,732,107 B1 * | 5/2004 | Luo et al. | ............ | 707/100 |
| 6,804,678 B1 * | 10/2004 | Luo et al. | ............ | 707/101 |
| 6,865,567 B1 * | 3/2005 | Oommen et al. | ............ | 707/2 |
| 2002/0194157 A1 * | 12/2002 | Zait et al. | ............ | 707/2 |

OTHER PUBLICATIONS

T. Urhan et al., "XJoin: Getting Fast Answers from slow and Bursty Networks", Technical Report, CS-TR-3994, UMIACS-TR-99-13, Feb. 1999.*
D. DeWitt et al. "Parallel Sorting on a Shared-Nothing Architecture using Probabilistic Splitting", Proc. Of the Int. Conf. On Parallel and Distributed Information Systems (PDIS) 1991: 280-291.*

(Continued)

*Primary Examiner*—Leslie Wong
(74) *Attorney, Agent, or Firm*—Trop, Pruner, Hu PC

(57) ABSTRACT

A parallel hash ripple join algorithm partitions tuples of two relations for localized processing. The algorithm is non-blocking and may be performed in a parallel, multi-processor environment. At each processing node, the tuples are further partitioned such that join operations may be performed as tuples are redistributed to each node during the partitioning.

36 Claims, 9 Drawing Sheets

OTHER PUBLICATIONS

Urhan, "XJoin: Getting Fast Answers from slow and Bursty Networks", Technical Report, CS-TR-3994, UMIACS-TR-99-13, Feb. 1999.*

DeWitt, "Parallel Sorting on a Shared-Nothing Architecture using Probabilistic Splitting", Proc. Of the Intl. Conf. On Parallel and Distributed Information Systems (PDIS) 1991: 280-291.*

Urhan et al., "Xjoin: Getting Fast Answers From Slow and Bursty Networks", Technical Report, CS-TR-3994, UMIACS-TR-99-13, Feb. 1999.*

R. Avnur et al., "Eddies: Continuously Adaptive Query Processing", SIGMOD Conf. 2000: 261-272.

D. Bitton et al., "Benchmarking Database Systems a Systematic Approach", VLDB 1983: 8-19.

J. Chen et al., "NiagaraCQ: A Scalable Continous Query System for Internet Databases", SIGMOD Conf. 2000: 379-390.

D. DeWitt et al., "A Performance Analysis of the Gamma Database Machine", SIGMOD Conf. 1988: 350-360.

D. DeWitt et al., "Client-Server Paradise", VLDB 1994: 558-569.

D. DeWitt et al., "Parallel Sorting on a Shared-Nothing Architecture Using Probabilistic Splitting", Proc. Of the Intl. Conf. On Parallel and Distributed Information Systems (PDIS) 1991: 280-291.

D. DeWitt et al., "An Evaluation of Non-Equijoin Algorithms", VLDB 1991: 443-452.

G. Graefe, "Query Evaluation Techniques for Large Databases", ACM Comput. Surveys, 25(2):73-170, Jun. 1993.

P. Haas, "Hoeffding Inequalities for Join-Selectivity Estimation and Online Aggregation", IBM Research Report RJ10040, 1996.

P. Haas, "Large-Sample and Deterministic Confidence Intervals for Online Aggregation", Proc. Ninth Intl. Conf. Scientific and Statistical Database Mangement, 1997, pp. 51-62.

P. Haas et al., "Join Algorithms for Online Aggregation", IBM Research Report RJ10126, 1998.

P. Haas, "Hoeffding Inequalities for Online Aggregation", Proc. Interface '99.

P. Haas, "Techniques for Online Exploration of Large Object-Relational Datasets", Proc. 11th Intl. Conf. Scientific and Statistical Database Management, 1999: 4-12.

J. Hellerstein et al., "Interactive Data Analysis: The Control Project", IEEE Computer, 32, Aug. 1999: 51-59.

J. Hellerstein et al., "Informix under CONTROL: Online Query Processing", Data Mining and Knowledge Discovery, 2000.

J. Hellerstein, "Online Processing Redux", IEEE Data Engineering Bulletin, Sep. 1997.

J. Hellerstein, "Looking Forward to Interactive Queries", Database Programming and Design, Aug. 1998.

J. Hellerstein et al., "Adaptive Query Processing: Technology in Evolution", IEEE Data Engineering Bulletin, Jun. 2000.

P. Haas et al., "Ripple Joins for Online Aggregation", SIGMOD Conf. 1999: 287-298.

J. Hellerstein et al., "Online Aggregation", SIGMOD Conf. 1997: 171-182.

C. Hidber, "Online Association Rule Mining", SIGMOD Conf. 1999: 145-156, May 20, 1998.

Z. Ives et al., "An Adaptive Query Execution System for Data Integration", SIGMOD Conf. 1999: 299-310.

J. Naughton et al., "The Niagara Internet Query System", submitted for publication, 2000.

F. Olken, "Random Sampling from Databases", Ph.D. Dissertation, UC Berkeley, Apr. 1993, available as Tech. Report. LBL-32883, Lawrence Berkeley Laboratories.

H. Pang et al., "Partially Preemptible Hash Joins", SIGMOD Conf. 1993: 59-68.

H. Pang et al., "Memory-Adaptive External Sorting", VLDB 1993: 618-629.

J. Patel et al., "Clone Join and Shadow Join: Two Parallel Algorithms for Executing Spatial Join Operations", Technical Report, University of Wisconsin, CS-TR-99-1403, Aug. 1999.

K. Ramasamy et al., "Set Containment Joins: The Good, The Bad and the Ugly", VLDB 2000.

V. Raman et al., "Online Dynamic Reordering for Interactive Data Processing", VLDB 1999.

D. Schneider et al., "A Performance Evaluation of Four Parallel Join Algorithms in a Shared-Nothing Multiprocessor Environment", SIGMOD Conf., Jul. 10, 1992, 110-121.

S. Seshadri et al., "Sampling Issues in Parallel Database Systems", Proc. Of the Intl. Conf. on Extending Database Technology (EDBT) 1992; 328-343.

A. Shatdal et al., "Adaptive Parallel Aggregation Algorithms", SIGMOD Conf. 1995: 104-114.

K. Tan et al., "Online Feedback for Nested Aggregate Queries with Multi-Threading", VLDB 1999, pp. 18-29.

T. Urhan et al., "XJoin: Getting Fast Answers from Slow and Bursty Networks", Technical Report, CS-TR-3994, UMIACS-TR-99-13, Feb. 1999.

* cited by examiner

SECOND STAGE

$MP_{Aj}$ BECAME FULL BEFORE $MP_{Bj}$ BECAME FULL:

| $DP_A$ $j^{th}$ ENTRY | $E_{ABj}$ |

BEFORE $MP_{Bj}$ BECOMES FULL:

| $MP_A$ $j^{th}$ ENTRY | ↔ | $MP_B$ $j^{th}$ ENTRY | $E_{ABj}$ |

AFTER $MP_{Bj}$ BECOMES FULL:

| $MP_A$ $j^{th}$ ENTRY | ←----→ | $DP_B$ $j^{th}$ ENTRY | $E_{ABj}$ |

SECOND STAGE (CONT.)

$MP_{Bj}$ BECAME FULL BEFORE $MP_{Aj}$ BECAME FULL:

BEFORE $MP_{Aj}$ BECOMES FULL:

AFTER $MP_{Aj}$ BECOMES FULL:

THIRD STAGE

MP$_{Aj}$ BECAME FULL BEFORE MP$_{Bj}$ BECAME FULL:

MP$_{Bj}$ BECAME FULL BEFORE MP$_{Aj}$ BECAME FULL:

METHOD AND APPARATUS FOR PERFORMING HASH JOIN

BACKGROUND

Relational databases are used for storage and retrieval of information. The information is structured in the database as two-dimensional tables of rows and columns. A column heading designates the type of data stored in each column. The information is stored in a non-volatile medium such as a disk array.

Users may access the database information typically by using database management software. The database storage media and management software together comprise a database management system, or DBMS. DBMSs may be implemented on a centralized mainframe system, or may be distributed in a client-server network, as examples.

The database management software includes specialized commands for accessing the database information. For example, a common command for accessing data is a Structured Query Language (SQL) "select" query. Using the select query, one or more rows from one or more tables of the database may be retrieved.

Traditionally, DBMSs processed queries in batch mode. In other words, a user wanting to extract information from the database would submit a query, wait a long time during which no feedback is provided, and then receive a precise answer.

Today, on-line aggregation and adaptive query processing present alternatives to traditional batch query processing. On-line aggregation permits progressively refined running aggregates of a query to be continuously displayed to the requesting user. The running aggregates, or intermediate results, are displayed typically along with a "confidence" factor. Adaptive query processing involves an iterative feedback process in which the DBMS receives information from its environment and uses the information to adapt the behavior of the query.

One area of optimization involves join operations. When queries involving multiple tables are made, a join operation may be performed. Upon receiving the multi-table query, tuples, or rows, from one table are joined with tuples from a second table, to produce a result. An equijoin is a type of join operation in which an entry, or column, of a tuple from one table has the same value as an entry of a tuple from a second table.

SUMMARY

In accordance with the embodiments described herein, a method and apparatus are disclosed in which first tuples are stored in a first table in a database system, second tuples are stored in a second table of the database system. The first and second tuples are partitioned into plural portions and redistributed to plural nodes according to the partitioning. The first and second tuples are joined to produce result tuples as the first and second tuples are redistributed to the plural nodes. Result tuples are available immediately.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

On-line aggregation is distinguishable from traditional batch processing in that intermediate results are quickly displayed and continuously updated to the user. Where batch processing produces a final answer, usually after a long wait, on-line aggregation produces intermediate results based on a sampling of the database. Ideally, the intermediate results proceed toward the final answer, with each iteration, thus, giving the user a "sense" of the query result, without having to wait for the final result.

Obtaining intermediate results that proceed toward the final answer occurs when the samples are retrieved from the database at random. Random samples tend to produce successively more precise answers as more tuples are processed.

Another consideration when performing query processing is resource-related. A typical database query involving a join operation may involve retrieving thousands or even millions of tuples. Each tuple is stored in a stable, non-volatile location, such as a disk drive. The tuple is typically retrieved to a volatile location, such as a memory, during query processing. The available memory may limit the number of tuples loaded at a time.

A join operation involves comparisons between tuples of two different tables. Each tuple of each table is compared to each tuple of the other table. Once a tuple from a first table is retrieved to memory, a join operation may be processed between the tuple and all tuples from a second table.

If the tuple is to be processed in its entirety, both the first tuple and all tuples from the second table are in memory. If fewer tuples are actually loaded in memory, the tuple may be retrieved a second time from disk. Join processing thus involves tradeoffs between available memory and the amount of disk access that occurs.

Figure 1A:
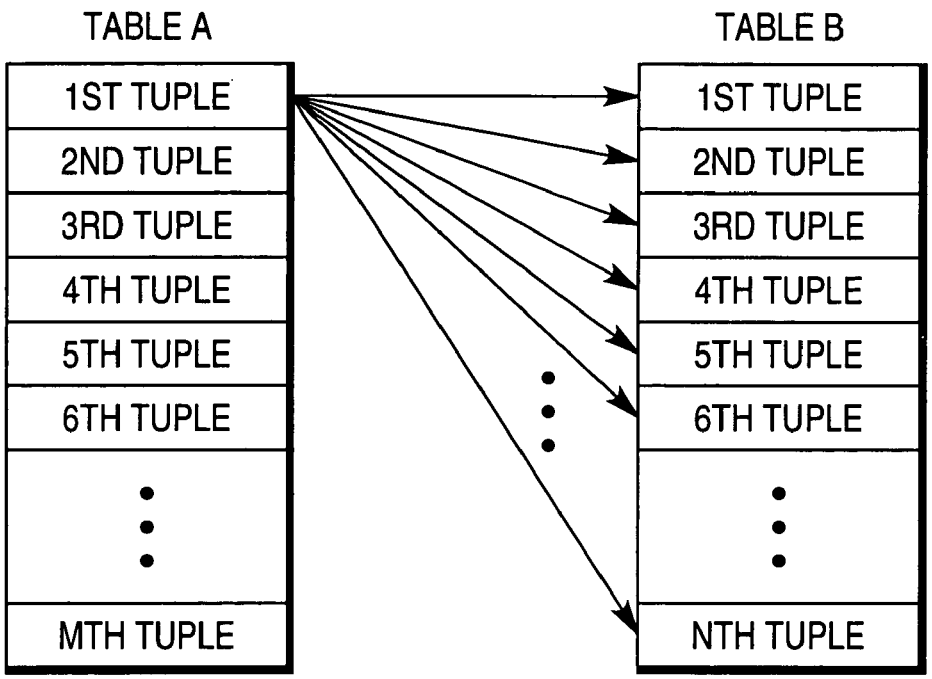
FIGS. 1A and 1B are block diagrams illustrating a sequential join operation according to one embodiment of the invention.

For example, in FIG. 1A, a first table, table A, includes M tuples, or rows, while a second table, table B, includes N tuples. (Ignore, for the moment, the fact that the tables may be distributed across multiple nodes in a parallel RDBMS.) To perform a join operation between tables A and B, each tuple of table A is compared with each tuple of table B.

The join operation may be performed sequentially, as depicted in FIG. 1A. The first tuple of table A is compared with each tuple of table B, one after the other. The first tuple of table A is compared with the first tuple of table B, then the second tuple of table B, and so on, as shown, until the Nth (final) tuple of table B is processed.

Figure 1B:
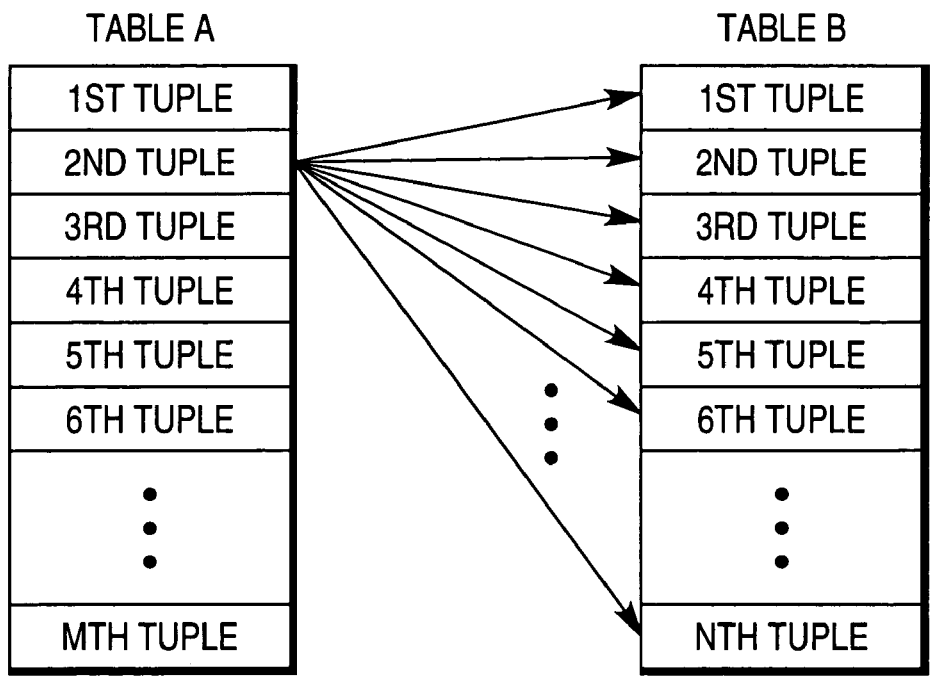

Then, as illustrated in FIG. 1B, the second tuple of table A is compared with each tuple of table B in turn. The second tuple of table A is compared with the first tuple of table B, then with the second tuple of table B, and so on, until the Nth tuple of table B. The process continues until the Mth (final) tuple of table A is compared to each of the N tuples of table B.

Such an algorithm is neither efficient in terms of resource allocation nor random. Since all the tuples of table B are processed for each tuple of table A, at least N+1 tuples of memory storage are used. (Recall that the tables may each include thousands or millions of tuples.) The process is not random because all the tuples of table B are processed for each tuple of table A, an inherent bias toward table B. Plus, the tuples for each table may or may not be in random order, which further negates the randomness of the process.

Parallel Hash Ripple Join Algorithm

The join processing illustrated in FIGS. 1A and 1B is thus not possible for on-line aggregation and adaptive query processing. Instead, according to one embodiment, a parallel hash ripple join algorithm may be performed. The algorithm is symmetric because the tables to be joined are treated the same. No preference for one table over the other is made during processing.

The algorithm is adaptive because memory consumption is adjusted based on available resources and characteristics of each table. In one embodiment, more memory space is dynamically allocated to reduce disk input/outputs (I/Os). The tuples are partitioned such that join processing need be performed only between corresponding partitions. As many tuples as possible for each partition are kept in memory. If the memory overflows, the entire unjoined partition of tuples is written to disk. This leads to relatively good performance, especially in the case where the query is not terminated prior to completion.

The parallel hash ripple join algorithm is non-blocking (e.g., meaningful intermediate results are produced), even when memory overflow occurs. In one embodiment, the algorithm generates result tuples for the join operation in a random order, as is typical for on-line aggregation and adaptive query processing.

The algorithm operates in two phases, an in-memory phase and a disk phase. In one embodiment, the order in which join result tuples are generated is random for the in-memory phase and nearly random for the disk phase.

The parallel hash ripple join algorithm may be implemented in either a single-processor database system or in a multi-processor, parallel database system. The algorithm may be used for on-line aggregation or adaptive query processing in very large distributed databases, for example.

Operating Environment

Figure 2:
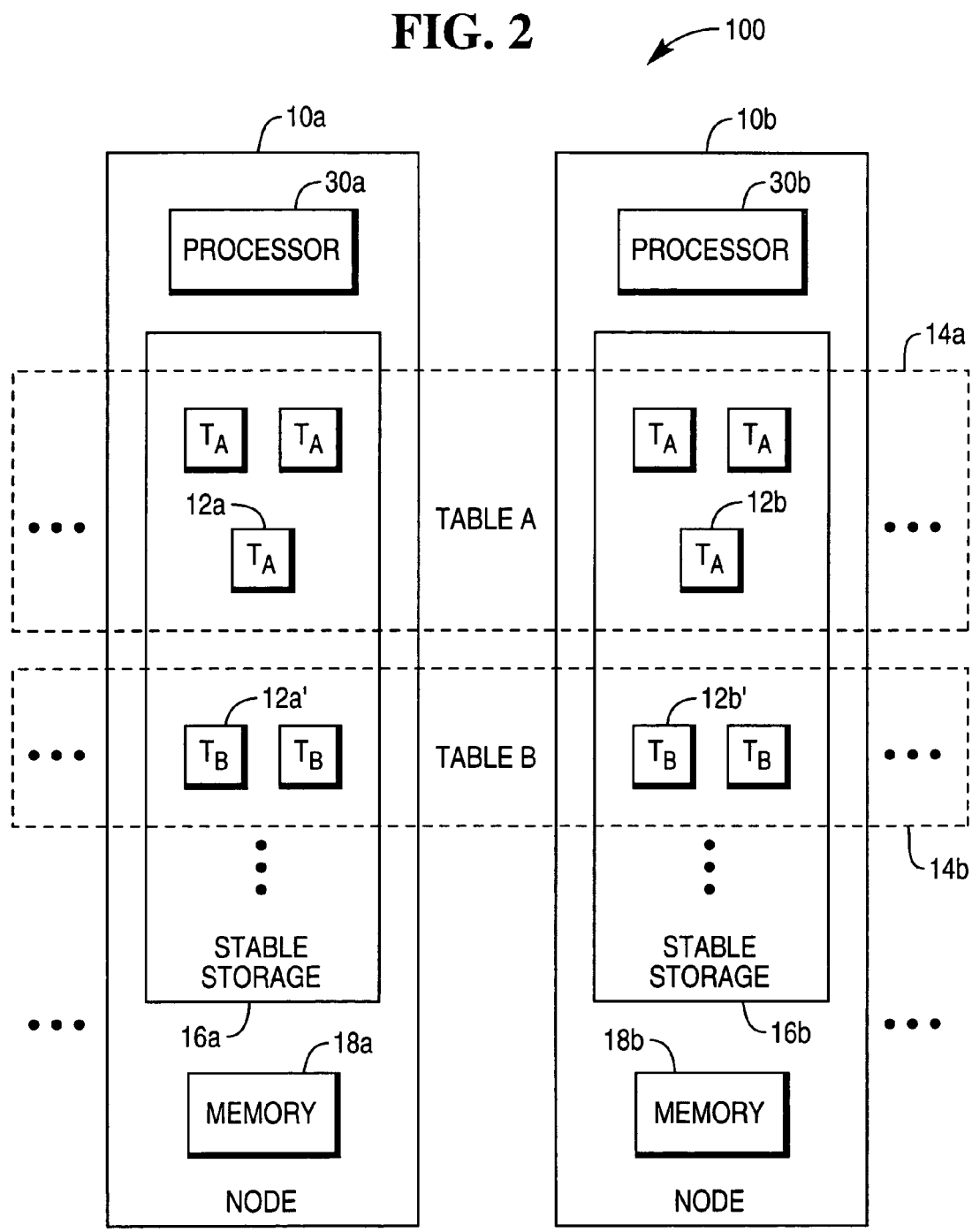
FIG. 2 is a block diagram of a parallel RDBMS according to one embodiment of the invention.

In FIG. 2, a parallel relational database management system 100, or parallel RDBMS, according to one example, includes a plurality of nodes 10. Two nodes 10a and 10b of the plurality of nodes 10 are depicted. Each node 10 includes a processor 30, for executing application programs, such as database management software.

A first table 14, called table A, includes tuples 12, also known as rows, in which the tuples are distributed on the two nodes 10a and 10b. Tuples 12a of table A ($T_A$) are found on one node 10a, while the remaining tuples 12b of table A are found on another node 10b. Likewise, a second table 14, called table B, includes tuples 12' ($T_B$) are also distributed on at least two nodes 10a and 10b. One set of tuples 12a' of table B are on one node 10a while the remaining tuples 12b' of table B are on another node 10b.

Both tables 14 may have additional tuples 12, distributed to additional nodes 10 of the parallel RDBMS 100. In one embodiment, the tuples 12 of each table 14 are distributed, as evenly as possible, across all the nodes 10 of the parallel RDBMS 100. In one embodiment, the tuples 12 for each node 10 are located in a stable storage 16, such as a hard disk drive or other non-volatile medium. Each node 10 additionally includes a memory 18, to which the tuples 12 may be transferred, such as during a join or other query processing operation.

Sample Query Involving Join Operation

In the following example SQL query, an equi-join between two tables, A and B is performed:

select online A.e, avg(B.z)
    from A, B
    where A.c=B.x
    group by A.e

A.c and B.x are attributes of the tables A and B, respectively, in which A.c is from column c of table A and B.x is from column x of table B. The query constructs an "online" average of attribute B.z (i.e., column z of table B) grouped by A.e (i.e., column e of table A) for those rows of table A (at column c) which are identical to rows of table B (at column x). Online, as used here, means generating the result tuples continuously. A "result table" is a two-column table, including column e of table A and the average of column z of table B. Where attributes, A.c and B.x, are identical, a join operation is performed.

Figure 3:
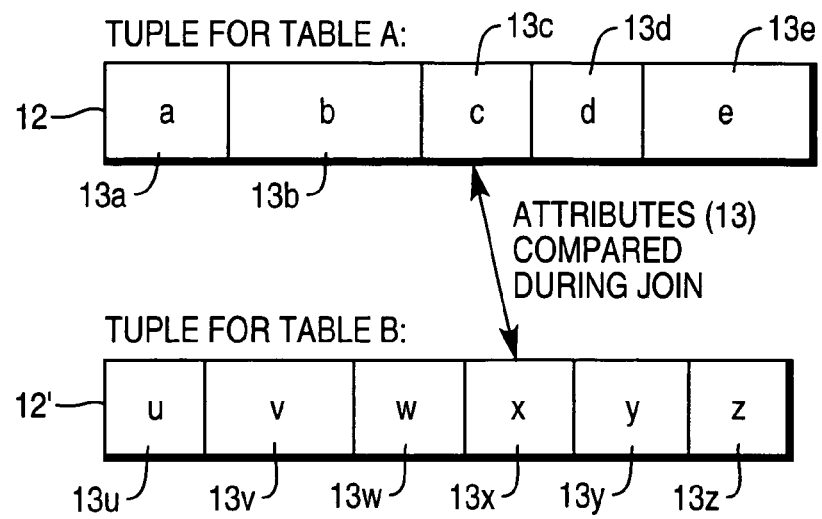
FIG. 3 is a block diagram of join tuples with attributes according to one embodiment of the invention.

The tuples 12 for table A and table B are illustrated in FIG. 3, according to one example. The tuple 12 for table A ($T_A$) includes several attributes 13, denoted a, b, c, d, and e. The tuple 12' for table B ($T_B$) includes similar attributes 13, denoted u, v, w, x, y, and z. In the example join operation, the attribute c of tuple 12 is compared to the attribute x of tuple 12', as illustrated by the double-sided arrow.

A hash join is a join operation that is performed using a hash table. Hash functions are familiar to computer science. For a value, x, a hash function, f, maps x to another value, y. The value x may be a number, a string, a spatial object, and so on. The value y is called the hash value of x. As a simple example, where an integer is mapped to mod 10, integers, 1, 11, and 21 are all mapped to the hash value 1.

A hash table is a table with many entries. Each entry deals with a specific hash value. Those values whose hash values are the same each end up in the same entry of the hash table. The hash table is thus a data structure for organizing data. Hash joins utilize hash functions and hash tables.

Traditionally, a parallel hash join is performed in two phases. First, tuples of one relation (known as a build relation) are redistributed to the nodes where the join will run. The tuples are added to the in-memory hash tables as they arrive at the nodes. Next, the tuples of a second relation (the probe relation) are redistributed to the same nodes. The hash tables built in the first phase are probed for each tuple of the probe relation that arrives at the nodes.

On-line aggregation is a type of query processing that permits progressively refined running aggregates of a query to be continuously displayed to the requesting user. On-line aggregation thus produces non-blocking query results, or results that are available soon after the query begins execution.

For non-blocking operations such as required by online aggregation, the two-phase operation for query processing is generally imperfect. For one, the build relation is favored over the probe relation, early in the processing, such that any results produced are skewed. Further, the redistribution phase (for the build relation) is completed before any join operations begin, causing undesirable delays in producing results.

Redistribution of Tuples

In one embodiment, the parallel hash ripple join algorithm performs join operations while the tuples are being redistributed to the nodes 10. Accordingly, join results may be available much sooner than with traditional join algorithms.

Originally, tuples, or rows, of tables A and B are stored at the nodes according to some partitioning strategy, such as hash partitioning, range partitioning, or round-robin partitioning. The partitioning strategy typically attempts to distribute the tuples for a given table evenly across all available nodes of the relational database.

According to one embodiment, the parallel hash ripple join algorithm re-partitions the tuples 12. The tuples 12 are partitioned such that the tuples 12 for which the attributes 13 being compared during the join operation (e.g., A.c and B.x) have identical values end up on the same node 10. The tuples 12 for each table 14 are thus redistributed to the nodes 10 to "localize" the join processing.

Recall that the join operation involves comparing tuples of two tables. In one embodiment, the parallel hash ripple join algorithm partitions the two tables such that identical tuples (i.e., tuples in which an attribute has the same value) from each table end up on the same node.

Figure 4:
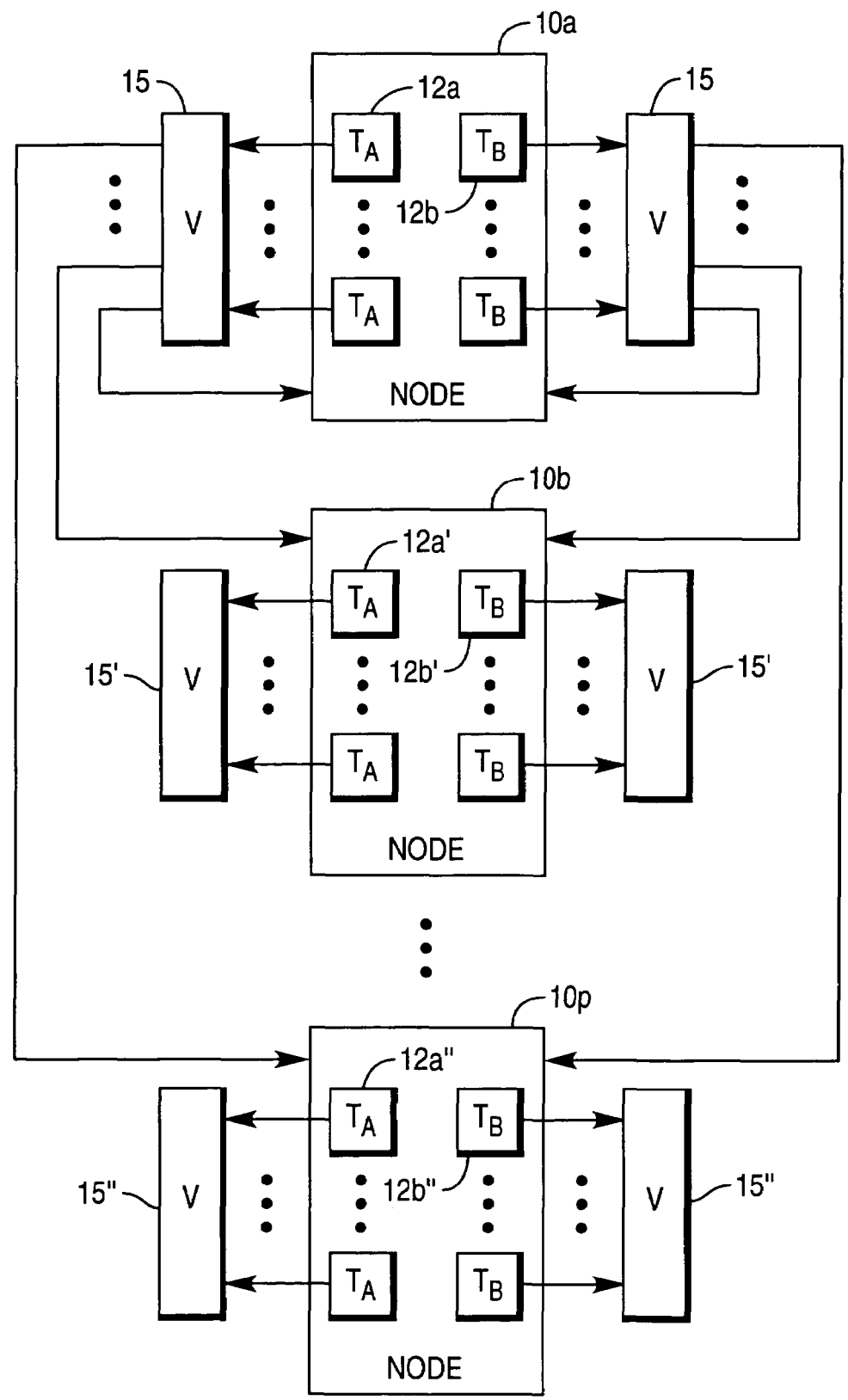
FIG. 4 is a block diagram of split vector operation according to one embodiment of the invention.

In one embodiment, each table 14 uses a split vector 15 (V) to redistribute the tuples 12, as illustrated in FIG. 4. For a join operation involving table A and table B, for example, split vector V redistributes tuples $T_A$ and $T_B$, respectively, to the nodes 10.

In one embodiment, the split vector partitions the tuples $T_A$ and $T_B$ such that each node 10 has roughly the same workload. The split vector V, for example, may perform sampling or use histograms to evenly distribute the tuples to the various nodes 10.

In one embodiment, the split vector 15 operates upon the join attribute 13 for each tuple $T_A$ and $T_B$. Based on the join attribute value, such as attribute c of table A (A.c), the split vector 15 divides the tuples $T_A$ into partitions. The tuples $T_A$ are redistributed onto the various nodes 10 according to the partitions.

Likewise, the split vector 15 divides the tuples $T_B$ into partitions, based upon the join attribute value, such as attribute x of table B (B.x). The tuples TB are also redistributed onto the various nodes 10 according to the partitions.

In FIG. 4, according to the split vector V, tuples $T_A$ are redistributed to node 10a, node 10b, . . . , and node 10p. Tuples $T_B$ are redistributed to node 10a, node 10b, . . . , and node 10p, also using the split vector V.

Split vector 15' for node 10b likewise redistributes tuples 12a' and 12b', to the nodes 10a, 10b, . . . , and 10p. Split vector 15" for node 10p redistributes tuples 12a" and 12b", to the nodes 10a, 10b, . . . , and 10p.

Once the split vector V is created, a parallel hash ripple join algorithm simultaneously performs operations on each node 10 using multi-threading. These operations are depicted in FIG. 5, according to one embodiment.

For each table 14 that includes tuples 12 on a node 10, the tuples 12 are received from stable storage 16 and written into memory 18 (block 202). Then, as described above, a split vector 15 for the table 14 is used to redistribute the tuples 12 to all the nodes 10 that are part of the parallel RDBMS 100 (block 204). In one embodiment, the tuples 12 are distributed evenly across all nodes 10 of the parallel RDBMS 100. Once redistributed, the tuples 12 are joined using the adaptive symmetric hash join algorithm, as described below (block 206).

Figure 5:
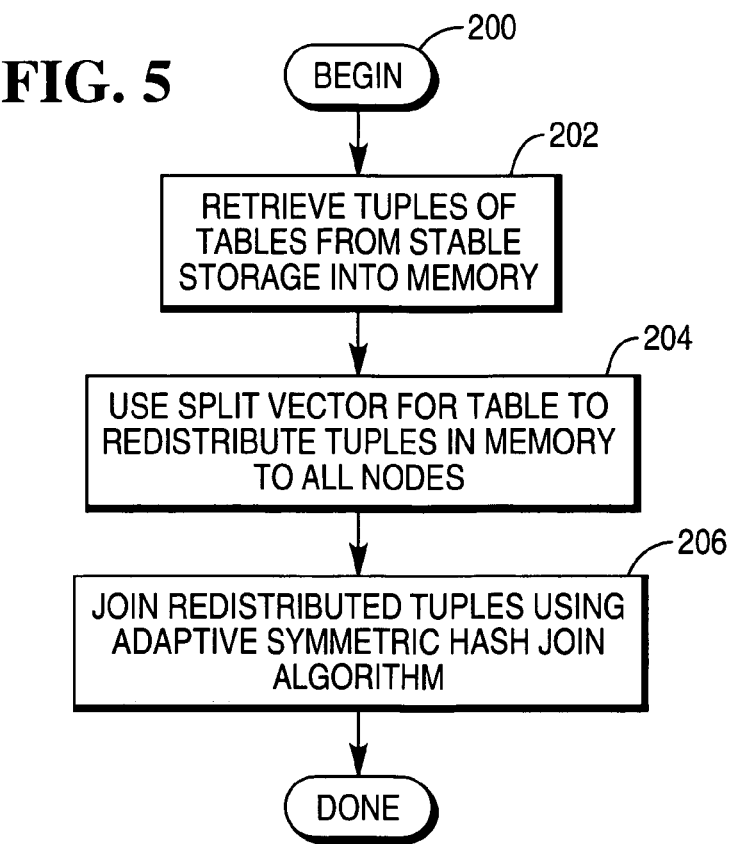
FIG. 5 is a flow diagram of the parallel hash ripple join algorithm according to one embodiment of the invention.

The operations of FIG. 5 are independently and simultaneously performed for both tables A and B of the join operation. When the tuples 12 of tables A and B are redistributed according to the split vector V, the adaptive symmetric hash join algorithm may be implemented.

Hash Tables

According to the redistribution strategy described above, each node 10 receives tuples 12 from each of tables A and B, one after another. Since the tuples 12 are used for the join operation, the join operation may be performed as the tuples 12 arrive at the node.

Figure 6:
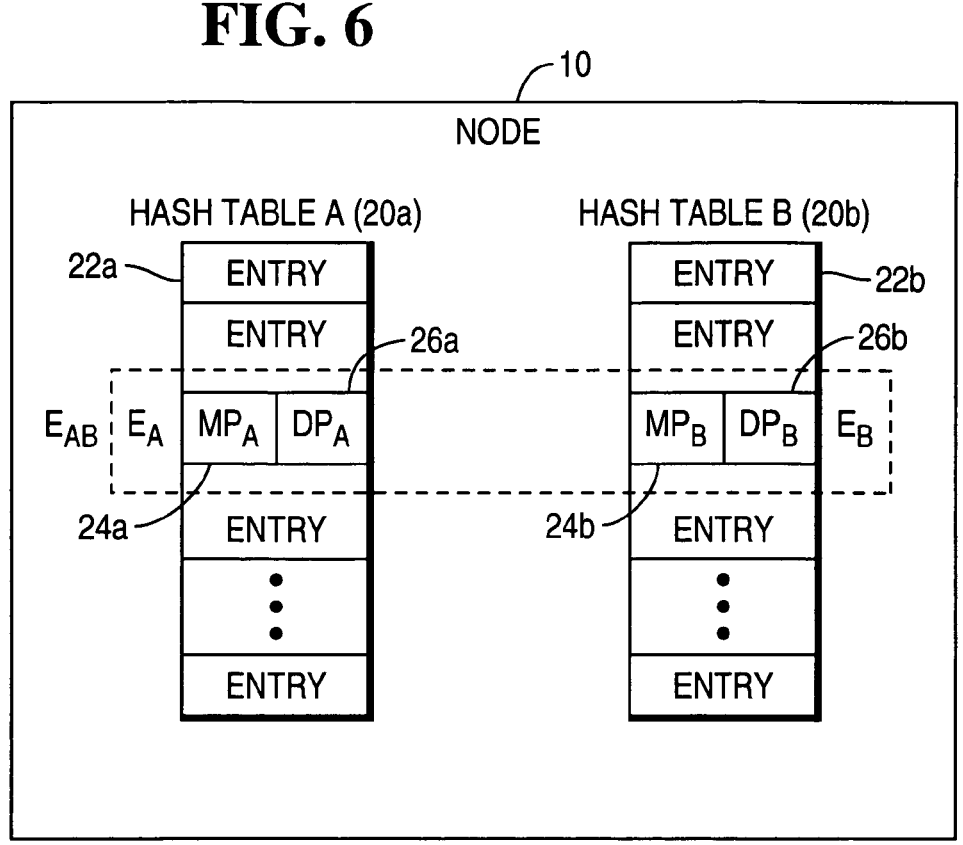
FIG. 6 is a block diagram of hash tables on a node according to one embodiment of the invention.

The incoming tuples 12 are thus arranged to facilitate the join operation, according to one embodiment. Each node 10 of the parallel RDBMS 100 includes two hash tables, $H_A$ and $H_B$, the former for receiving the tuples 12 of table A, the latter for receiving the tuples 12 of table B. The hash tables are associated with the join attributes 13 of each table 14. Two hash tables 20, one for table A and one for table B, are found in each node 10, as illustrated in FIG. 6.

The hash table 20 is essentially a data structure used to maintain the tuples 12 during the join operation. Hash table $H_A$ is allocated for table A; hash table $H_B$ is allocated for table B.

Each hash table 20 includes several entries 22. The entries 22 represent yet another partitioning of the tuples 12 for the table 14. To each node 10, a portion or subset of all tuples 12 of each table 14 is sent, as defined by the split vector 15. As an indexing scheme for the incoming tuples, the hash table 20 further divides the tuples 12 on the node 10 using entries 22. Each entry 22 holds tuples 12 in which the join attribute 13 has a certain hash value.

In one embodiment, the entries $E_A$ ($E_B$) each include both a memory-resident part 24 $MP_A$ ($MP_B$) and a disk-resident part $DP_A$ ($DP_B$). The memory-resident part $MP_A$ ($MP_B$) of the entry $E_A$ ($E_B$) occupies a portion of the memory 18 while the disk-resident part 26 $DP_A$ ($DP_B$) occupies a portion of the stable storage 16 (see FIG. 2).

In FIG. 6, the node 10 includes hash table $H_A$ (20a) for table A and hash table $H_B$ (20b) for table B. Likewise, other nodes 10 that include tuples 12 for tables A and B include hash tables 20 for each table 14.

A dotted rectangle encloses entry $E_A$ of hash table $H_A$ and entry $E_B$ of hash table $H_B$. The $j^{th}$ entry $E_{Aj}$ and the $j^{th}$ entry $E_{Bj}$ are referred to as the $j^{th}$ entry pair $E_{ABj}$. Some parts of the algorithm operate on entries $E_{Aj}$ and $E_{Bj}$ individually, while other parts operate-on entry pairs $E_{ABj}$.

Adaptive Symmetric Hash Join Algorithm

In one embodiment, the adaptive symmetric hash join algorithm, which is performed at each node 10 of the parallel RDBMS 100, includes three stages. In the first stage, the redistributed tuples 12 are received by the node 10, then join operations are performed, as many as possible, while the tuples 12 are in memory.

The second stage is triggered when one of the memory parts allocated for the entries has grown to a predetermined size limit. Transfers to stable storage occur. Join operations between tuples in both memory parts $MP_A$ ($MP_B$) and disk parts $DP_A$ ($DP_B$) of the entries $E_A$ ($E_B$) also occur, according to one embodiment. Once all tuples 12 have been redistributed to the node 10, the third stage performs all joins that were not performed in the first and second stages.

First Stage—Joining Redistributed Tuples Using Available Memory

In the first stage of the algorithm, the tuples 12 are being redistributed to the nodes 10 according to the split vector V, then are arranged in entries 22 of the respective hash tables 20, according to the arrangement described above. The tuples 12 are initially loaded into the memory parts $MP_A$ and $MP_B$ of hash tables $H_A$ and $H_B$, respectively. Accordingly, many memory-to-memory join operations may be performed, as the tuples 12 are received by the node 10.

In the first stage, the entries 22 process the incoming tuples 12 independently. That is, entry 22a from hash table 20a processes tuples 12 for table A while entry 22b from hash table 20b processes tuples 12' for table B. Likewise, each entry 22 of each hash table 20 is processed independently from each other entry 22 of the table 20.

Figure 7:
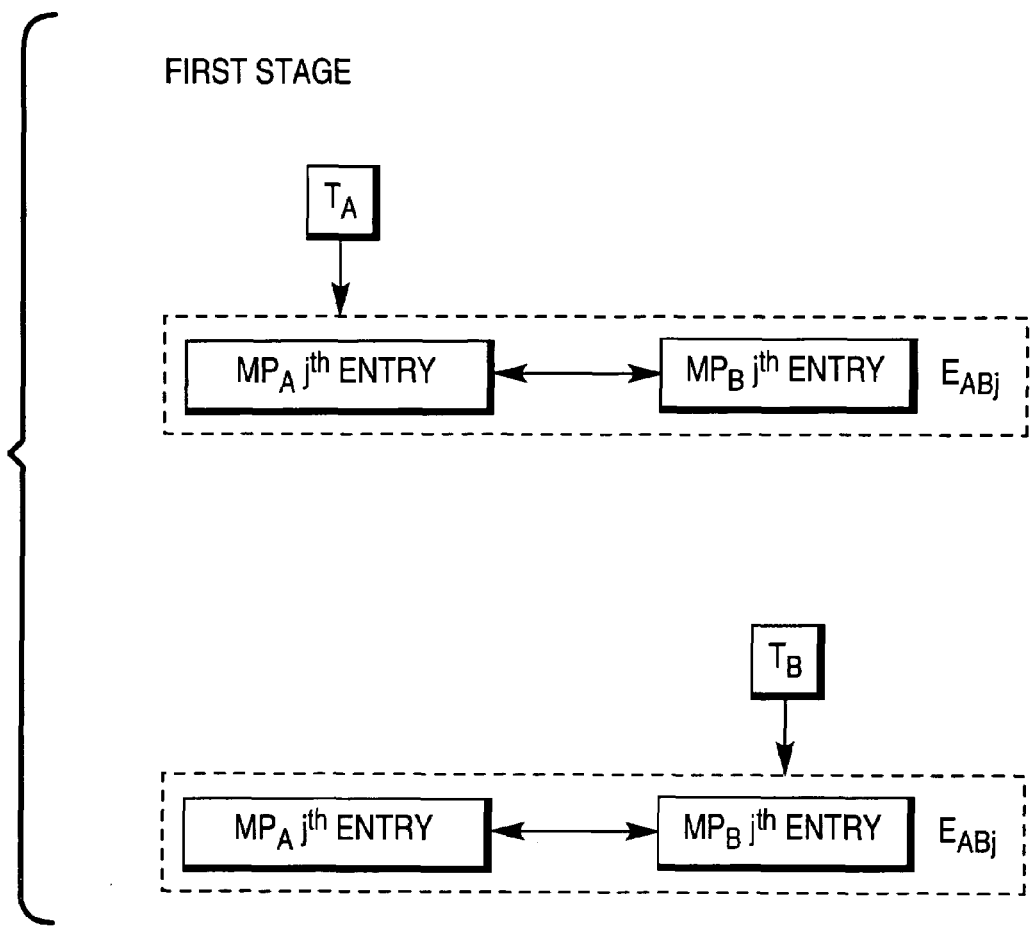
FIG. 7 is a block diagram of the first stage of the adaptive symmetric hash join algorithm according to one embodiment of the invention.

The first stage is illustrated in FIG. 7, according to one embodiment. As a tuple $T_A$ is redistributed to the node 10 (according to the split vector V), the appropriate entry pair $E_{ABj}$ is identified. In one embodiment, a hash function is employed to quickly arrive at the entry pair $E_{ABj}$. At first, all tuples 12 are received into a memory part, MP, as each entry 22 includes storage for at least one tuple 12.

As FIG. 7 shows, the tuple $T_A$ is inserted into $MP_A$, then joined with the tuples in the memory part for the $j^{th}$ entry of table B. In other words, each time a tuple $T_A$ arrives at the memory part of the $j^{th}$ entry $MP_{Aj}$, the tuple $T_A$ is joined with all the tuples in $MP_{Bj}$. Recall that the entry $MP_{Bj}$ may include many tuples. Alternatively, where the entry $MP_{Bj}$ includes no tuples, no join operations are performed.

Likewise, as the tuple $T_B$ arrives at the node, $T_B$ is inserted into $MP_B$, then joined with the tuples in the memory part for the $j^{th}$ entry of table A, as also depicted in FIG. 7. In other words, each time a tuple $T_B$ arrives at the memory part of the $j^{th}$ entry $MP_{Bj}$, the tuple $T_B$ is joined with all the tuples in $MP_{Aj}$.

In one embodiment, the algorithm dynamically grows $MP_A$ and $MP_B$ as tuples $T_A$ and TB, respectively, arrive at the node 10. The parallel RDBMS 100 allocates a certain amount of memory for each entry 22 of each hash table 20. However, at some point, the memory needed to store the incoming tuples 12 may exceed the memory allocation for one or more of the entries 22.

In one embodiment, the memory parts for each entry 22 may be dynamically adjusted. For example, for each $MP_{Aj}$ and $MP_{Bj}$, prior to becoming full, the memory amount may be increased, such as by allocating an additional memory page to the entry 22. Likewise, memory pages may be dynamically removed, as desired. Or, a memory page may be moved from one entry 22 to another. By dynamically adjusting the memory amounts during processing, the algorithm is partially memory adaptive and thus well-suited for multi-user real-time environments.

Second Stage—Joining Redistributed Tuples When Memory Overflows

In prior art join algorithms, a memory overflow condition seriously affects performance of the joins. In contrast, according to one embodiment, the adaptive symmetric hash join algorithm continues to receive tuples from redistribution and to join them such that performance is not seriously affected.

When the memory part $MP_A$ ($MP_B$) is filled before the memory part $MP_B$ ($MP_A$) during the first stage (e.g., no more memory is available for that entry 22), both entries $E_A$ and $E_B$ are processed in a second stage, as entry pair $E_{AB}$. Entry pairs $E_{AB}$ may arrive at the second stage at different times. However, as in the first stage, the entries $E_A$ and $E_B$ are processed independently, after arriving together at the second stage.

Figure 8A:
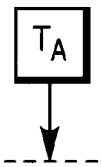
FIGS. 8A and 8B are block diagrams of the second stage of the adaptive symmetric hash join algorithm according to one embodiment of the invention.
Figure 8A:
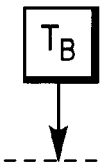
Figure 8A:
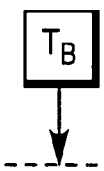

Accordingly, the memory overflow of either entry $E_A$ or $E_B$ of entry pair $E_{AB}$ causes the entire entry pair $E_{AB}$ to proceed to the second stage, as illustrated in FIG. 8A. What happens in the second stage depends on which memory part was filled first, $MP_A$ or $MP_B$, during the first stage.

Where the memory part of an entry for table A ($MP_A$) is filled first, i.e., before the memory part of an entry for table B ($MP_B$), all subsequent tuples $T_A$ received into the entry pair $E_{ABj}$ are written to disk (i.e., stable storage 16). This occurs because of an overflow of the available memory for the entry 22. In FIG. 8A each tuple $T_A$ is stored in $DP_{Aj}$, as shown.

For tuples $T_B$, however, the $MP_{Bj}$ did not overflow at the first stage. Accordingly, as long as $MP_{Bj}$ does not overflow, each incoming tuple $T_B$ is received into $MP_{Bj}$, then joined with all the tuples $T_A$ in the memory part $MP_{Aj}$, as depicted in FIG. 8A.

Once $MP_{Bj}$ becomes full, however, incoming tuples $T_B$ are joined with tuples $T_A$ in $MP_{Aj}$. The tuples $T_B$ are then sent to stable storage 16 or $DP_{Bj}$, as illustrated in FIG. 8A.

Figure 8B:
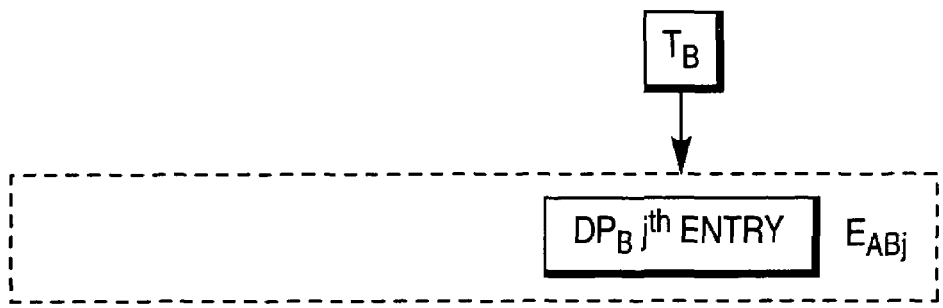
Figure 8B:
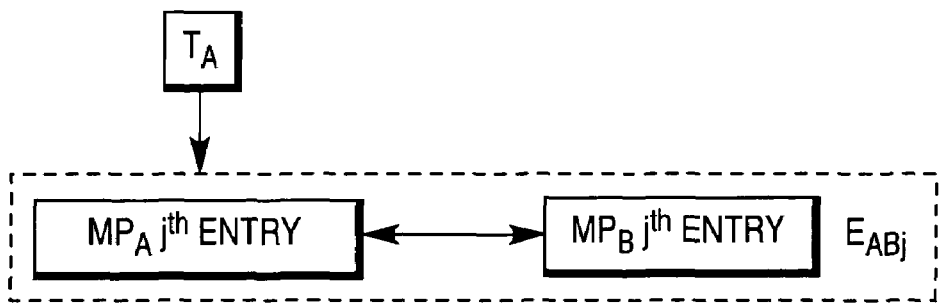
Figure 8B:
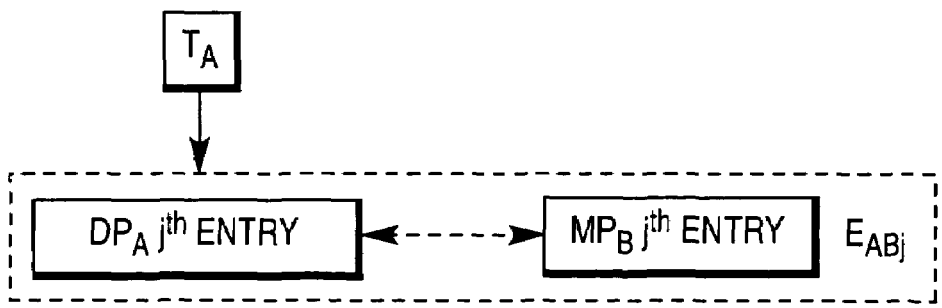

FIG. 8B shows the reverse, but symmetric, operations of the second stage, in which the memory part $MP_{Bj}$ became full before the memory part $MP_{Aj}$ became full in the first stage. In one embodiment, all entry pairs $E_{AB}$ enter the second stage at different times, but they enter the third stage at the same time, that is, once redistribution to the node 10 is complete.

At this point, for a hash table entry pair $E_{AB}$, if $MP_A$ ($MP_B$) in $E_{AB}$ became full first at the first stage, then all the tuples $T_B$ ($T_A$) in $E_B$ ($E_A$) have been joined with the tuples $T_A$ ($T_B$) in $MP_A$ ($MP_B$). At the third stage, the tuples in $E_B$ ($E_A$) are joined with the tuples in $DP_A$ ($DP_B$).

Third Stage—Performing Remaining Join Operations (Redistribution Complete)

In the third stage, according to one embodiment, entry pairs $E_{AB}$ are selected one-by-one, randomly and non-repetitively. The third stage essentially performs all join operations not performed in the first and second stages.

Because many of the join operations involve disk parts, DP, a new in-memory hash table, $H_{DP}$, is created that uses a different hash function than the hash function used for hash tables $H_A$ and $H_B$.

Figure 9:
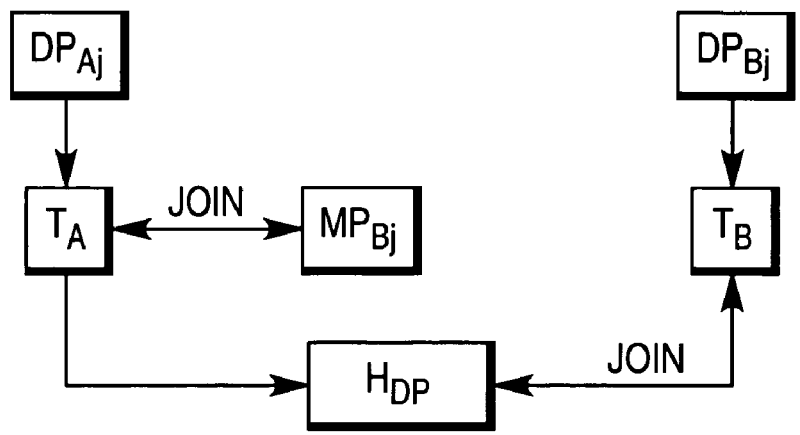
FIG. 9 is a block diagram of the third stage of the adaptive symmetric hash join algorithm according to one embodiment of the invention.
Figure 9:
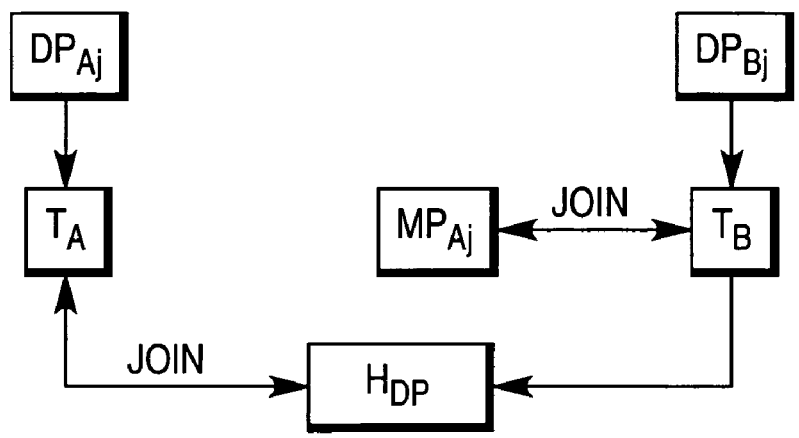

FIG. 9 illustrates operation of the third stage, according to one embodiment. In the third stage, entry pairs $E_{AB}$ of the hash tables $H_A$ and $H_B$ are each selected, one by one, randomly and non-repetitively, using a random selection algorithm.

Recall that the entry pair $E_{AB}$ includes a memory part and a disk part for each entry $E_A$ and $E_B$. Thus, $E_{AB}$ includes a $MP_A$, $DP_A$, $MP_B$, and $DP_B$. The third stage operates according to which memory part got full first, $MP_A$ or $MP_B$, in the first stage, above.

Where $MP_A$ got full first in the first stage, tuples $T_A$ are read from the disk part $DP_A$ into the in-memory hash table $H_{DP}$, according to one embodiment. As each tuple $T_A$ is read into the in-memory hash table $H_{DP}$, a join operation is performed between the tuple $T_A$ and tuples $T_B$ in $MP_B$ of the entry pair $E_{AB}$, as illustrated in FIG. 9.

Then, tuples $T_B$ are read from the disk part $DP_B$ into the memory, as illustrated. As each tuple $T_B$ is transferred, the tuple $T_B$ is joined with tuples TA already loaded into the in-memory hash table $H_{DP}$. Once all tuples $T_A$ and $T_B$ in the entry pair have been joined, the in-memory hash table $H_{DP}$ is freed and the operation is performed on a new entry pair $E_{AB}$, chosen randomly from the hash tables $H_A$ and $H_B$.

The analogous operations of the third stage may be performed for the case where $MP_{Bj}$ became full before $MP_{Aj}$ did. These operations are also depicted in FIG. 9, according to one embodiment.

Random Selection Algorithm

In one embodiment, a random selection algorithm is employed to select the entry pairs $E_{AB}$, one by one, until all entry pairs have been retrieved. Programmers of ordinary skill in the art recognize that a variety of random selection algorithms may be available for this purpose.

The adaptive symmetric hash join algorithm, which is performed at each node 10 of the parallel RDBMS 100, thus includes the three stages described above. In one embodiment, all the join result tuples are computed once, to ensure that a correct join result is obtained. Further, the adaptive symmetric hash join algorithm is non-blocking, which ensures that intermediate results are available. By localizing tuples, which is performed by partitioning using a split vector and hash tables, a more efficient mechanism is provided for performing the join operations. The join results are also obtained and processed randomly ensuring that the intermediate results obtained are meaningful.

The various nodes and systems discussed each includes various software layers, routines, or modules. Such software layers, routines, or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective control unit cause the corresponding node or system to perform programmed acts.

The instructions of the software routines, modules, or layers are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines, modules, or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   storing first tuples in a first table in a database system;
   storing second tuples in a second table in the database system, wherein the first and second tuples are distributed across plural nodes of the database system;
   partitioning the first and second tuples into plural portions;
   redistributing the first and second tuples across the plural nodes according to the partitioning; and
   hash joining the first and second tuples to produce result tuples as the first and second tuples are being redistributed across the plural nodes.

2. The method of claim 1, further comprising:
   retrieving the result tuples at random.

3. The method of claim 1, wherein hash joining the first and second tuples to produce result tuples as the first and second tuples are being redistributed across the plural nodes comprises:
   producing result tuples at one of the plural nodes; and
   simultaneously producing result tuples at a second of the plural nodes.

4. The method of claim 1, wherein redistributing the first and second tuples across the plural nodes comprises redistributing based on split vectors containing predefined ranges.

5. The method of claim 4, wherein partitioning the first and second tuples into plural portions comprises:
   partitioning first and second tuples into hash tables in each node.

6. The method of claim 5, wherein hash joining the first and second tuples comprises:
   allocating a portion of a memory to a first hash table;
   allocating a second portion of the memory to a second hash table; and
   hash joining first tuples in the first hash table with second tuples in the second hash table.

7. The method of claim 6, wherein hash joining the first and second tuples comprises:
   determining that the portion of the memory allocated to the first hash table is full;
   allocating a stable storage to the first hash table; and
   storing first tuples in the stable storage.

8. The method of claim 7, further comprising:
   continuing to store second tuples in the second hash table; and
   hash joining second tuples in the second hash table with first tuples in the first hash table.

9. The method of claim 8, further comprising:
   determining that the second portion of the memory allocated to the second hash table is full;
   allocating a second stable storage to the second hash table;
   storing second tuples in the second stable storage; and
   hash joining second tuples in the second stable storage with first tuples in the first hash table.

10. The method of claim 9, wherein hash joining the first and second tuples comprises:
   generating a third hash table once all first tuples and second tuples are redistributed to each node;
   retrieving one of the first tuples from the stable storage;
   hash joining the one of the first tuples with tuples in the second hash table; and
   storing the one of the first tuples in the third hash table.

11. The method of claim 10, further comprising:
   retrieving one of the second tuples from the second stable storage; and
   hash joining the one of the second tuples with tuples in the third hash table.

12. A database system comprising:
   a plurality of nodes; and
   one or more machine readable storage media containing instructions for enabling the database system to:
      store first tuples in a first table distributed across the plurality of nodes;
      store second tuples in a second table distributed across the plurality of nodes;
      partition the first and second tuples into plural portions;
      redistribute the first and second tuples to the plurality of nodes according to the partition; and
      hash join the first and second tuples to produce result tuples as the first and second tuples are being redistributed to the plurality of nodes.

13. The database system of claim 12, wherein the result tuples are available at random.

14. The database system of claim 12, wherein each node comprises a memory, and wherein the instructions further partition the first and second tuples into plural portions by:
   partitioning first tuples into first hash tables; and
   partitioning second tuples into second hash tables, wherein the first and second hash tables are in corresponding memories of the nodes.

15. The database system of claim 14, wherein the instructions further:
   in each node, allocate a portion of the memory to a corresponding first hash table;
   in each node, allocate a second portion of the memory to a corresponding second hash table; and
   in each node, hash join first tuples in the first hash table with second tuples in the second hash table.

16. The database system of claim 15, wherein the instructions further:
   in each node, determine that the portion of the memory allocated to a corresponding first hash table is full; and
   in each node, store first tuples in a stable storage in response to determining that the portion of the memory is full.

17. The database system of claim 16, wherein the instructions further:
   in each node, continue to store second tuples in a corresponding second hash table; and
   in each node, hash join second tuples in the second hash table with first tuples in the first hash table.

18. The database system of claim 17, wherein the instructions further:
   in each node, determine that the second portion of the memory allocated to the second hash table is full;
   in each node, allocate a second stable storage to the second hash table;
   in each node, store second tuples in the second stable storage; and
   in each node, hash join second tuples in the second stable storage with first tuples in the first hash table.

19. The database system of claim 18, wherein the instructions further:
   generate a third hash table once all first tuples and second tuples are redistributed to each node;
   in each node, retrieve one of the first tuples from the stable storage;
   in each node, hash join the one of the first tuples with tuples in the second hash table; and
   in each node, store the one of the first tuples in the third hash table.

20. The database system of claim 19, wherein the instructions further:
   in each node, retrieve one of the second tuples from the second stable storage; and
   in each node, hash join the one of the second tuples with tuples in the third hash table.

21. An article comprising a machine readable storage media storing instructions for enabling a processor-based system to:
   store first tuples in a first table in a database system;
   store second tuples in a second table in the database system, wherein the first and second tuples are distributed across plural nodes of the database system;
   partition the first and second tuples into plural portions;
   redistribute the first and second tuples across the plural nodes of the database system according to the partition; and
   hash join the first and second tuples to produce result tuples as the first and second tuples are being redistributed across the plural nodes.

22. The article of claim 21, further storing instructions for enabling a processor-based system to:
   retrieve the result tuples once the hash join is performed.

23. The article of claim 22, further storing instructions for enabling a processor-based system to:
   redistribute based on split vectors containing predefined ranges.

24. The article of claim 23, further storing instructions for enabling a processor-based system to:
   partition first and second tuples into hash tables in each node.

25. The article of claim 24, further storing instructions for enabling a processor-based system to:
   allocate a portion of a memory to a first hash table;
   allocate a second portion of the memory to a second hash table; and
   hash join first tuples in the first hash table with second tuples in the second hash table.

26. The article of claim 25, further storing instructions for enabling a processor-based system to:
   determine that the portion of the memory allocated to the first hash table is full; and
   store first tuples in a stable storage.

27. The article of claim 26, further storing instructions for enabling a processor-based system to:
   continue to store second tuples in the second hash table; and
   hash join second tuples in the second hash table with first tuples in the first hash table.

28. The article of claim 27, further storing instructions for enabling a processor-based system to:
   determine that the second portion of the memory allocated to the second hash table is full;
   allocate a second stable storage to the second hash table;
   store second tuples in the second stable storage; and
   hash join second tuples in the second stable storage with first tuples in the first hash table.

29. The article of claim 28, further storing instructions for enabling a processor-based system to:
- generate a third hash table once all first tuples and second tuples are redistributed to each node;
- retrieve one of the first tuples from the stable storage;
- hash join the one of the first tuples with tuples in the second hash table; and
- store the one of the first tuples in the third hash table.

30. The article of claim 29, further storing instructions for enabling a processor-based system to:
- retrieve one of the second tuples from the second stable storage; and
- hash join the one of the second tuples with tuples in the third hash table.

31. The method of claim 1, wherein each of the nodes contains a first hash table to receive first tuples, and a second hash table to receive second tuples, the method further comprising:
- storing redistributed first tuples in respective first hash tables; and
- storing redistributed second tuples in respective second hash tables.

32. The method of claim 31, wherein hash joining first tuples and second tuples comprises hash joining first tuples and second tuples from corresponding first and second hash tables.

33. The database system of claim 12, wherein each of the nodes contains a first hash table to receive first tuples, and a second hash table to receive second tuples,
wherein the instructions further:
- store redistributed first tuples in respective first hash tables; and
- store redistributed second tuples in respective second hash tables.

34. The database system of claim 33, wherein the instructions further hash join the first tuples and the second tuples from corresponding first and second hash tables.

35. The article of claim 21, wherein each of the nodes contain a first hash table to receive first tuples, and a second hash table to receive second tuples, wherein the instructions when executed cause the processor-based system to further:
- store redistributed first tuples in respective first hash tables; and
- store redistributed second tuples in respective second hash tables.

36. The article of claim 35, wherein hash joining first tuples and second tuples comprises hash joining first tuples and second tuples from corresponding first and second hash tables.

* * * * *